(12) United States Patent
Paek et al.

(10) Patent No.: US 8,482,514 B2
(45) Date of Patent: Jul. 9, 2013

(54) INK SUBS RATE, ELECTROPHORETIC DISPLAY DEVICE HAVING THE SAME, AND METHOD OF FABRICATING THE SAME

(75) Inventors: Seung Han Paek, Incheon (KR); Kyung Lock Kim, Gyeonggi-do (KR); Sang Soo Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 821 days.

(21) Appl. No.: 11/827,323

(22) Filed: Jul. 10, 2007

(65) Prior Publication Data
US 2008/0143669 A1 Jun. 19, 2008

(30) Foreign Application Priority Data

Dec. 19, 2006 (KR) .................. 10-2006-0130117
Jun. 26, 2007 (KR) .................. 10-2007-0062801

(51) Int. Cl.
*G09G 3/34* (2006.01)
*G02B 26/00* (2006.01)

(52) U.S. Cl.
USPC .................. 345/107; 345/84; 359/296

(58) Field of Classification Search
USPC .............. 345/30, 84, 107, 48–49; 359/296
See application file for complete search history.

(56) References Cited

U.S. PATENT DOCUMENTS

| 5,724,187 | A | * | 3/1998 | Varaprasad et al. | .......... 359/608 |
| 2003/0184704 | A1 | * | 10/2003 | Akiyama et al. | .............. 349/158 |
| 2004/0027327 | A1 | * | 2/2004 | LeCain et al. | ................ 345/107 |
| 2007/0040798 | A1 | * | 2/2007 | Kawai | ........................... 345/107 |

FOREIGN PATENT DOCUMENTS

JP 2005-114820 4/2005
WO 2005/103808 A1 11/2005

OTHER PUBLICATIONS

Office Action issued in corresponding Chinese Patent Application No. 200710143235.6; issued Mar. 18, 2010.
Office Action cited in corresponding Chinese Patent Application No. 2007101432356; issued Jun. 19, 2009.

* cited by examiner

*Primary Examiner* — Lun-Yi Lao
*Assistant Examiner* — Jarurat Suteerawongsa
(74) *Attorney, Agent, or Firm* — Brinks Hofer Gilson & Lione

(57) ABSTRACT

An ink substrate, an electrophoretic display device including the ink substrate and methods of fabricating the display, where in ink substrate includes a first substrate, an electrode adjacent the first substrate, and an ink layer adjacent the electrode, the ink layer including a plurality of microcapsules. At least one protective member is disposed on at least a side surface of the ink layer and a protective film disposed on a rear surface of the first substrate opposite the ink layer. The protective member is formed by one of spaying an ink protection liquid on at least the side surfaces of the ink layer or dipping at least the side surfaces of the ink layer into an ink protection liquid and curing the ink protection liquid to form a solid film. The protective member is an impact resistant, heat resistant, and moisture resistant material.

10 Claims, 9 Drawing Sheets

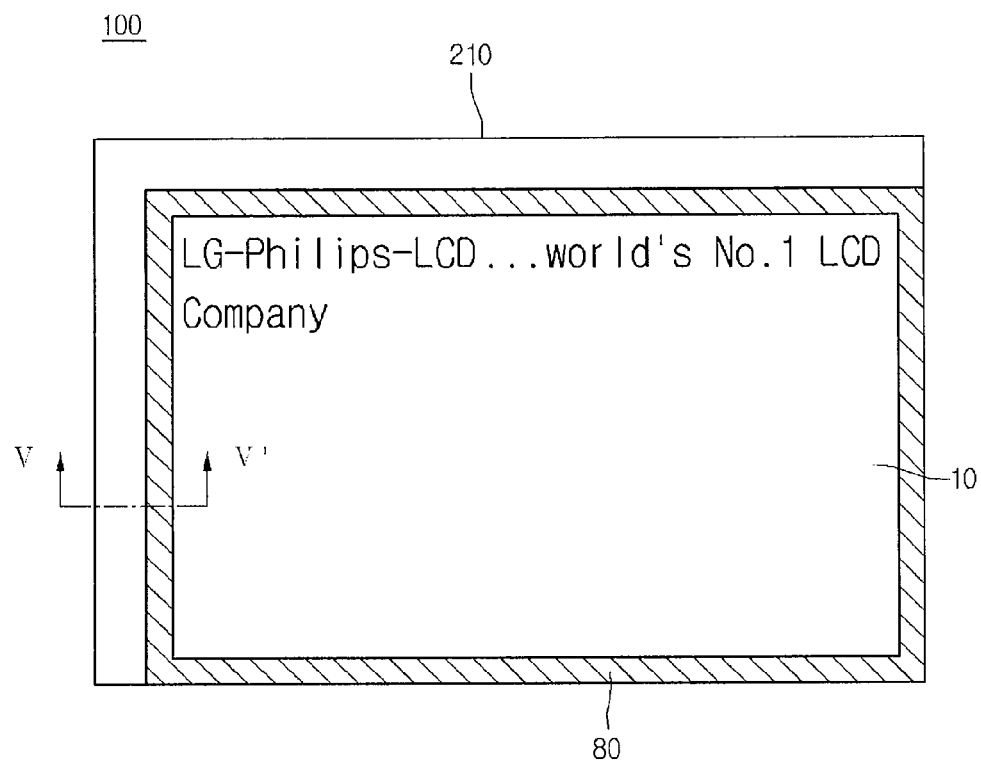

INK SUBSTRATE, ELECTROPHORETIC DISPLAY DEVICE HAVING THE SAME, AND METHOD OF FABRICATING THE SAME

PRIORITY CLAIM

This Non-provisional Application claims priority under 35 U.S.C. §119(a) to Korean Patent Application Nos. 0130117/2006 filed Dec. 19, 2006 and 0062801/2007 filed on Jun. 26, 2007, the subject matter of which is hereby incorporated by reference.

BACKGROUND

1. Technical Field

The present invention relates to an ink substrate, an electrophoretic display device having the same, and a method of fabricating the same.

2. Description of the Related Art

Data of newspapers or magazines can be provided through a display device for a personal computer (PC) connected to the Internet.

Recently, a display device such as an electronic paper (E-Paper) has been actively developed, which is adapted to display only data of books, newspapers, magazines, or the like.

Generally, an E-paper is realized in an electrophoretic display device that drives charged particles by electrophoresis to display data.

The electrophoretic display device continues to display data without consuming additional power unless it receives an electrical signal for a rewriting operation. Therefore, the electrophoretic display device has an advantage of low power consumption. The electrophoretic display device includes an ink substrate including the charged particles.

FIG. 1A is a sectional view of an ink substrate included in an electrophoretic display device according to a related art. FIG. 1B is an enlarged view of microcapsules of the ink substrate illustrated in FIG. 1A.

Referring to FIGS. 1A and 1B, an ink substrate 510 includes a first electrode 530 disposed on a substrate 520, an ink layer 550 disposed on the first electrode 530 and including a plurality of microcapsules 560, and a release paper 540 covering the ink layer 550.

Each of the microcapsules 560 includes a capsule wall 565, a transparent liquid 563 and charged particles 570 that are filled within the capsule wall 565.

The charged particles 570 include first particles 570a for displaying a white image and second particles 570b for displaying a black image. The first particles 570a and the second particles 570b of each microcapsule 560 can move in a direction opposite to each other, thereby displaying white and black images.

The release paper 540 is disposed on the ink layer 550 in order to protect the microcapsules 560.

The side surface of the ink layer 550 may be exposed to the outside. For example, the ink layer 550 may be cut into a predetermined size for a particular type of a display device. Such ink layer 550 may be delivered and/or stored before it is used for the display device. The ink layer 550 is affected by external factors such as impact, heat, moisture, or the like. Therefore, the exposed microcapsules 560 of the ink layer 550 may be easily damaged due to impact, heat, moisture, or the like, so that malfunction can occur in driving the charged particles.

The release paper 540 may be removed from the ink substrate 510, and then the ink substrate 510 may be attached to a driving substrate (not shown) including a second electrode, whereby fabricating an electrophoretic display device.

In this case, since the microcapsules 560 disposed in a side surface of the ink layer 550 is exposed to the outside, it may be easily damaged due to impact, heat, moisture, or the like, which leads to malfunction in driving the electrophoretic display device.

SUMMARY

In one embodiment, an ink substrate includes a substrate and an electrode adjacent the substrate. An ink layer resides adjacent the electrode, the ink layer including a plurality of microcapsules. A release paper is disposed on the ink layer and a protective member is disposed on at least a side surface of the ink layer.

In another embodiment, an electrophoretic display device includes an ink substrate, a driving substrate and a protective film. The ink substrate includes a first substrate, an electrode adjacent the first substrate, an ink layer adjacent the electrode, the ink layer including a plurality of microcapsules, and a first protective member disposed on at least a side surface of the ink layer. The first protective member is operable to seal the ink layer. The driving substrate is attached to the ink substrate having the sealed ink layer, the driving substrate including a second substrate and a plurality of driving devices disposed thereon.

In yet another embodiment, a method of fabricating an electrophoretic display includes forming an ink substrate having an electrode and an ink layer on the electrode. A release paper is applied on the ink layer. A first protective member is formed on at least side surfaces of the ink layer. The release paper is removed and the ink substrate is attached to a driving substrate.

In still another embodiment, a method of fabricating an electrophoretic display includes forming an electrode on a first substrate and forming an ink layer on the electrode, the ink layer including a plurality of microcapsules. The first substrate, the electrode and the ink layer are cut to a desired size and a first release paper is applied on the ink layer and a second release paper is applied on a rear surface of the first substrate opposite the electrode. A first protective member is formed on at least side surfaces of the ink layer. The second release paper is removed and a protective film is formed on the rear surface of the first substrate. The second release paper is removed and the ink substrate is attached to a driving substrate. A second protective member is formed on the first protective member.

It is to be understood that both the foregoing general description and the following detailed description of the present invention are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a planar view showing an electrophoretic display device, which use an ink substrate, according to a fifth embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
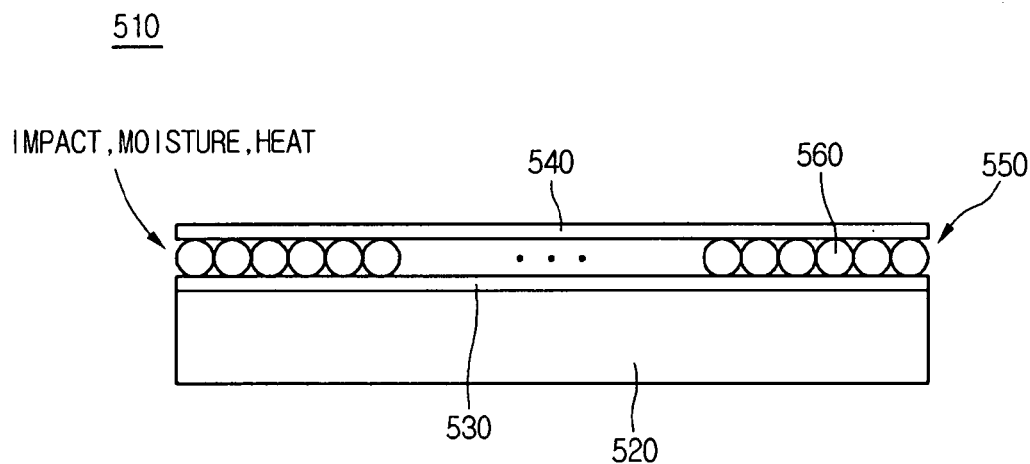
FIG. 1A is a sectional view of an ink substrate according to a related art.
Figure 1B:
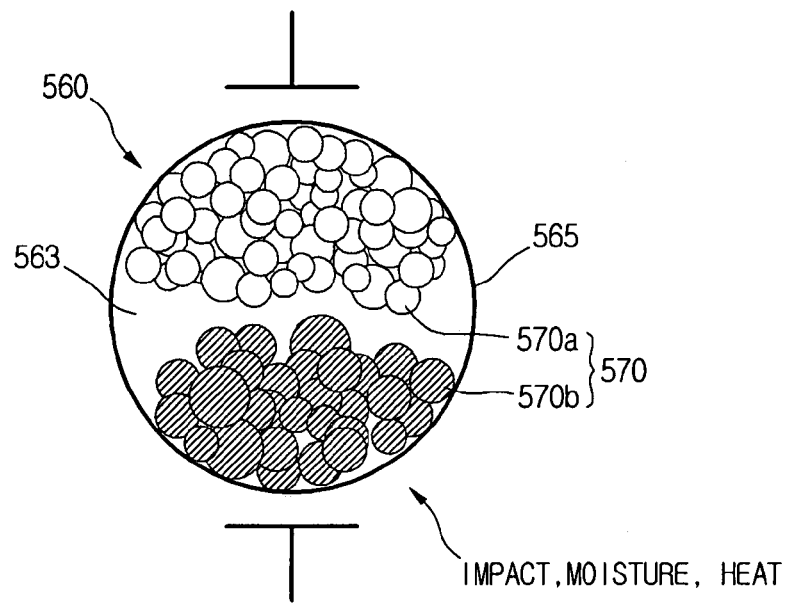
FIG. 1B is a view of microcapsules of the ink substrate illustrated in FIG. 1A.
Figure 2:
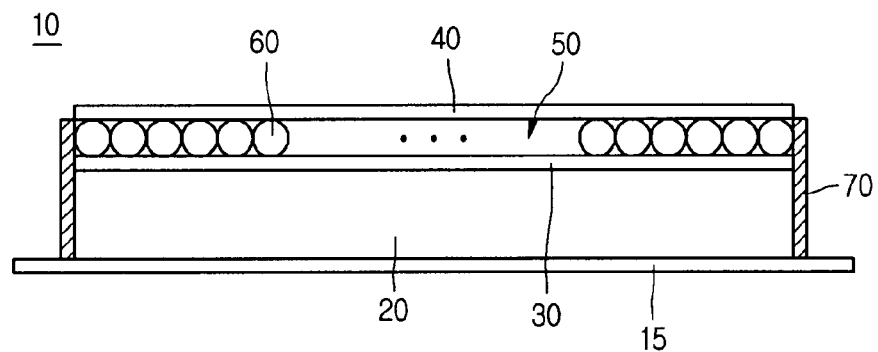
FIG. 2 is a sectional view of an ink substrate according to a first embodiment of the present invention.

FIG. 2 is a sectional view of an ink substrate according to a first embodiment of the present invention.

Referring to FIG. 2, an ink substrate 10 includes a first substrate 20, a first electrode 30 disposed on the first substrate 20, an ink layer 50 disposed on the first electrode 30 and including a plurality of microcapsules 60, a first release paper 40 disposed on the ink layer 50 to protect an upper surface of the ink layer 50, a first protective member 70 disposed on at least a side surface of the ink layer 50 to protect a side surface of the ink layer 50, and a second release paper 15 disposed on a rear surface of the first substrate 20 to protect a rear surface of the first substrate 20.

The first substrate 20 may be formed of a transparent and flexible material including a resin such as a polyethylene terephthalate (PET) resin or glass.

The first electrode 30 may be disposed on the first substrate 20. The first electrode 30 may be a common electrode that receives a common voltage. The first electrode 30 may be disposed on an entire surface of the first substrate 20.

Light is incident through the first substrate 20 or reflected thereon. Therefore, in order to protect the first substrate 20, the second release paper 15 may be disposed on a rear surface of the first substrate 20.

The ink layer 50 may include the plurality of microcapsules 60. Each of the microcapsules 60 includes a capsule wall, a transparent liquid and charged particles that fill the inside of the capsule wall. The charged particles may include first particles for displaying a white image and second particles for displaying a black image. The first particles may include titanium oxide ($TiO_2$), and the second particles may include carbon black.

Since the ink layer 50 is susceptible to impact, heat, moisture, and the like, the first release paper 40 may also be disposed on a side surface of the ink layer 50.

Also, the side surface of the ink layer 50, if exposed, is susceptible to impact, heat, moisture, and the like, and thus the first protective member 70 may be disposed on at least the side surface of the of the ink layer 50. The side surface of the ink layer 50 may be exposed by cutting a large ink substrate into smaller ink substrates having a predetermined size. For instance, a display device manufacturer may need a certain size ink substrate for manufacturing a particular display device. The first protective member 70 seals the exposed ink layer 50 without delay.

The first protective member 70 may be disposed on side surfaces of the ink layer 50, the first electrode 30, and the first substrate 20 without delay subsequent to the exposure of the side surface of the ink layer 50. As will be described below, the first protective member 70 covers at least the side surfaces of the ink layer 50 prior to coupling of the ink substrate and a driving substrate 90 of FIG. 3. Accordingly, the ink layer 50 is sealed before the driving substrate 90 is attached to the ink substrate 10.

Alternatively, or additionally, the first protective member 70 may be disposed on side surfaces of the first release paper 40, the ink layer 50, the first electrode 30, the first substrate 20, and the second release paper 15, and rear edges of the first and second release papers 40 and 15.

The first protective member 70 may be formed of a resin-based material such as a sealant, and the like. However, the present invention is not limited thereto, and any material that can strongly resist impact, heat, or moisture may be used for the first protective member 70.

The first electrode 30 may be a common electrode and may receive a common voltage for driving the microcapsules 60 of the ink layer 50.

The second release paper 15 may be formed larger than the first substrate 20. Accordingly, the first protective member 70 can be easily formed on a side surface of the ink layer 50 during a fabrication process, and this will be described in detail later.

Figure 3:
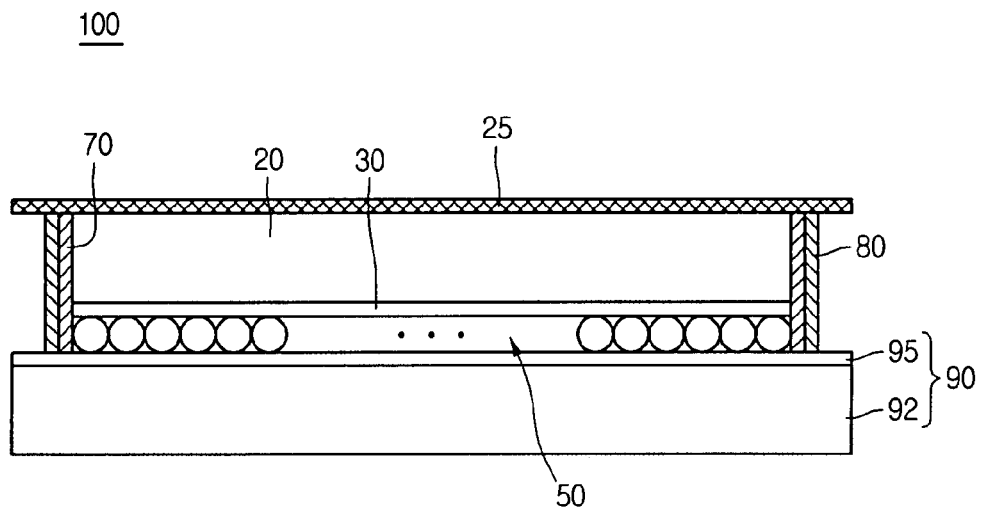
FIG. 3 is a sectional view of an electrophoretic display device having an ink substrate according to the first embodiment of the present invention.

FIG. 3 is a sectional view of an electrophoretic display device having an ink substrate according to the first embodiment of the present invention.

Referring to FIGS. 2 and 3, an electrophoretic display device 100 includes the ink substrate 10 and a driving substrate 90 attached to the ink substrate 10.

The ink substrate 10 may include a first electrode 30 and an ink layer 50. A first protective member 70 may be disposed on at least a side surface of the ink layer 50. The first protective member 70 may prevent microcapsules 60 of the ink layer 50 from being damaged due to impact, heat, moisture, or the like generated from an external environment.

The first electrode 30 and the ink layer 50 have already been described, and thus more description will not be given.

The driving substrate 90 may include a second substrate 92 and a driving device 95 disposed in each pixel of the second substrate 92. The pixel (not shown) may be defined by a gate line (not shown) and a data line (not shown) disposed on the second substrate 92.

The second substrate 92 may be formed of a flexible material including a resin such as a PET resin, glass, and metal. For instance, the second substrate 92 may be formed of stainless steel.

The driving device 95 may include a thin film transistor (TFT, not shown) disposed in each pixel defined by the gate line and the data line, and a second electrode (not shown) electrically connected with the TFT. At least one microcapsule 60 may be formed in each pixel.

The second electrode may be a pixel electrode that receives a data voltage for displaying a gray scale. The data voltage may be applied to the pixel electrode through the data line by control of the TFT.

A protective film 25 may be disposed on a rear surface of the first substrate 20 to protective a rear surface of the first substrate 20. Accordingly, after the second release paper 15 is removed from the ink substrate 10 illustrated in FIG. 2, the protective film 25 may be disposed on a rear surface of the first substrate 20.

The first protective member 70 may be disposed on a side surface of the ink layer 50.

The first protective member 70 may be disposed on side surfaces of the ink layer 50, the first electrode 30, and first substrate 20.

A second protective member 80 may be disposed on an outer surface of the first protective member 70. The second protective member 80 may be formed of the same material as the first protective member 70. Alternatively, the second protective member 80 may be formed of a different material from that of the first protective member 70. Various materials are available for the second protective member 80. As noted above in conjunction with FIG. 2, the first protective member 70 seals the ink layer 50 before the ink substrate 10 and the driving substrate 90 are coupled. The sealed ink layer 50 may be further protected from the coupling process of the driving substrate 90 to the ink substrate 10. The second protective member 80 may be disposed subsequent to the formation of the first protective member 70. Alternatively, the second protective member 80 may be disposed after the ink substrate 10 and the driving substrate 90 are coupled.

The second protective member 80 may have the same area as the first protective member 70. The second protective member 80 may be disposed on an outer surface of the first protective member 70 to correspond to at least a side surface of the ink layer 50. As the first and second protective members 70 and 80 are disposed as a double layer, a side surface of the ink layer 50 can be protected against impact, heat, moisture or the like generated from an external environment.

In the electrophoretic display device 100, a data voltage is applied to the second electrode (not shown) disposed on the second substrate 92 and a common voltage is applied to the first electrode 30 disposed on the first substrate 20, thereby generating an electric field between the first electrode 30 and the second electrode of the driving device 95. This electric field drives charged particles included in the microcapsules 60 of the ink layer 50 to display an image. The first and second particles are spaced apart from each other by the electric field in the microcapsules 60. Therefore, the first particles may reflect light to display a white image and the second particles may absorb light to display a black image.

FIGS. 4A to 4F are sectional views illustrating a method of fabricating an electrophoretic display device according to a second embodiment of the present invention.

Figure 4A:
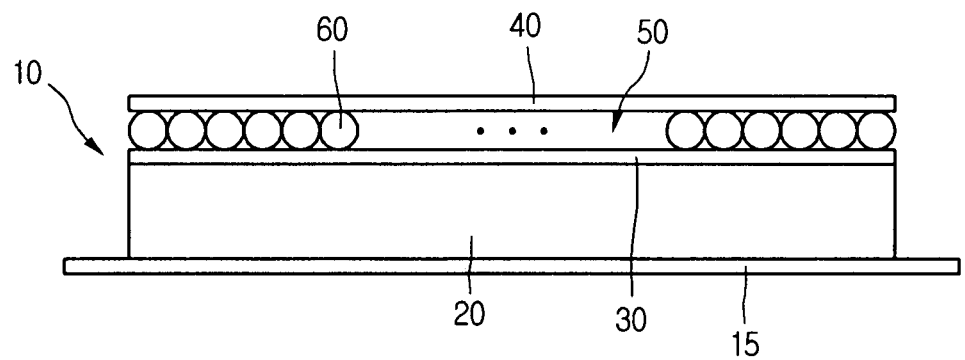
FIGS. 4A to 4F are sectional views illustrating a method of fabricating an electrophoretic display device according to a second embodiment of the present invention.

Referring to FIG. 4A, in order to provide an ink substrate 10, a first electrode 30 and an ink layer 50 are disposed on a first substrate 20 and a first release paper 40 is disposed on the ink layer 50. Also, a second release paper 15 having at least a larger area than the first substrate 20 is disposed on a rear surface of the first substrate 20.

Although not shown, a first adhesive layer may be disposed between the first electrode 30 and the ink layer 50 and a second adhesive layer may be disposed between the ink layer 50 and the first release paper 40. Therefore, the ink layer 50 may be fixed to the first electrode 30 by the first adhesive layer, and the first release paper 40 may be fixed to the ink layer 50 by the second adhesive layer.

The first substrate 20 may be formed of a transparent and flexible material including a resin such as a PET resin, and the like, or glass.

The first electrode 30 may be a common electrode receiving a common voltage.

The ink layer 50 may include a plurality of microcapsules 60. Each of the microcapsules 60 includes charged particles including first and second charged particles that can respond to an electric field.

The first release paper 40 protects an upper surface of the ink layer 50, and the second release paper 15 protects a rear surface of the first substrate 20.

The first substrate 20, the first electrode 30, and the ink layer 50 may be formed to have the same size by cutting them simultaneously using a laser cutting process.

After the laser cutting process, the first and second release papers 40 and 15 may be attached on an upper surface of the ink layer 50 and a rear surface of the first substrate 20, respectively.

Figure 4B:
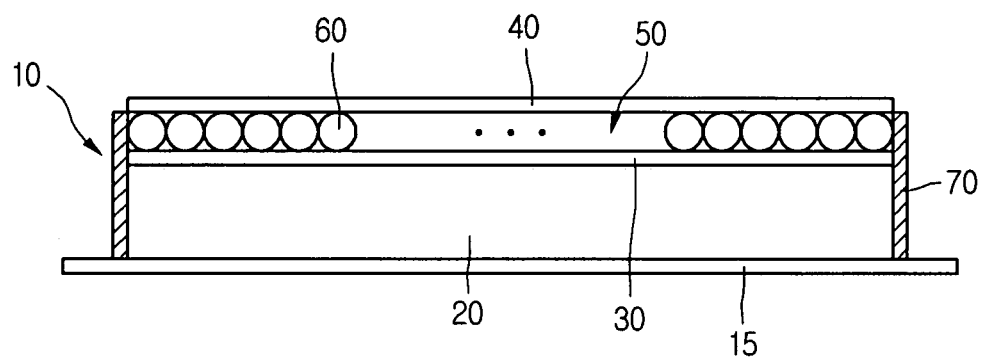
Figure 4C:
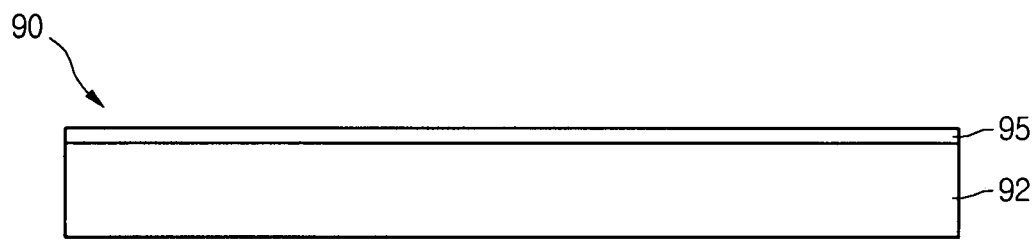
Figure 4D:
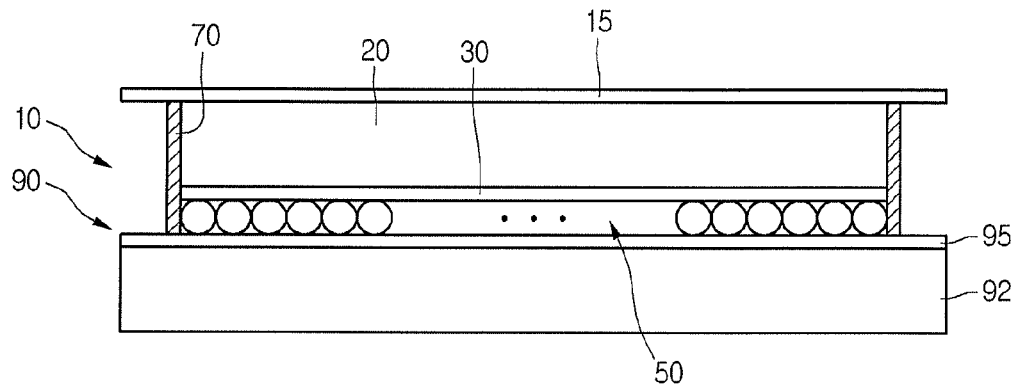

Referring to FIG. 4B, a first protective member 70 is formed on at least an exposed side surface of the ink layer 50 of the ink substrate 10. Preferably, the first protective member 70 is applied without delay subsequent to the exposure of the side surface of the ink layer 50. The first protective member 70 is applied at least before the driving substrate 90 is coupled to the ink substrate 10 as shown in FIGS. 4C and 4D. The first protective member 70 is formed using a deep coating process or an ink printing process.

When using the ink printing process, the ink substrate 10 is provided and an ink protection liquid is sprayed to an edge of the ink substrate 10. If necessary, the ink protection liquid may be obliquely sprayed to a side surface of the ink substrate 10 such that the first protective member 70 can be easily formed on a side surface of the ink substrate 10. Therefore, the first protective member 70 may be formed on a side surface of the ink layer 50. Alternatively, or additionally, the first protective member 70 may be formed on side surfaces of the ink layer 50, the first electrode 30, and the first substrate 20 to correspond to a side surface of the ink substrate 10.

The sprayed ink protection liquid is collected on the second release paper 15 having a larger area than the first substrate 20 so that the first protective member 70 can be easily formed on a side surface of the ink substrate 10.

When using the deep coating process, the ink substrate 10 is dipped to a predetermined depth from its side surface into a protection liquid including a resin-based material such as a sealant to form the first protective member 70 on at least a side surface of the ink layer 50. In this case, the second release paper 15 may have the same area as the first substrate 20. The ink substrate 10 may be dipped into the protection liquid such that side surfaces of the second release paper 15, the first substrate 20, the first electrode 30, the ink layer 50, and the first release paper 40 are coated with the protection liquid to correspond to a side surface of the ink substrate 10. In this case, the first protective member 70 may be formed on side surfaces of the second release paper 15, the first substrate 20, the first electrode 30, the ink layer 50, and the first release paper 40 and rear edges of the first and second release papers 40 and 15.

The first protective member 70 may be formed of a resin-based material such as a sealant.

Since the first protective member 70 is formed in a liquid state, it should be cured to a solid state.

Since the microcapsules 60 of the ink layer 50 are susceptible to heat, ultraviolet curing may be performed rather than thermal curing. Therefore, the first protective member 70 may be formed of a light-curable material that is cured by ultraviolet light.

The first protective member 70 may be formed on a side surface of the ink substrate 10 including at least a side surface of the ink layer 50. Therefore, the first protective member 70 may protect the ink layer 50 from being damaged due to impact, heat, moisture, or the like generated from an external environment.

Referring to FIG. 4C, a driving substrate 90 is provided. The driving substrate 90 includes a driving device 95 disposed on a second substrate 92 and including a TFT (not shown) and a second electrode (not shown) in each pixel.

The second substrate 92 may be formed of a flexible material including a resin-based material such as a PET resin, glass, or metal such as stainless steel.

Each pixel may be defined by a gate line (not shown) and a data line (not shown) disposed on the second substrate 92.

The TFT of each pixel may be electrically connected with the gate and date lines. The second electrode may be electrically connected with the TFT, and may be a pixel electrode receiving a data voltage.

Therefore, the driving device 95 including the TFT and the second electrode may be formed in each pixel.

Referring to FIG. 4D, the ink substrate 10 is attached to the driving substrate 90. In detail, the first release paper 40 is removed from the ink layer 50 of the ink substrate 10, and then the ink substrate 10 is pressed such that the second adhesive layer of the ink layer 50 is adhered to the driving device 95 of the driving substrate 90. Therefore, the ink substrate 10 can be firmly fixed to the driving substrate 90 by using the second adhesive layer.

Figure 4E:
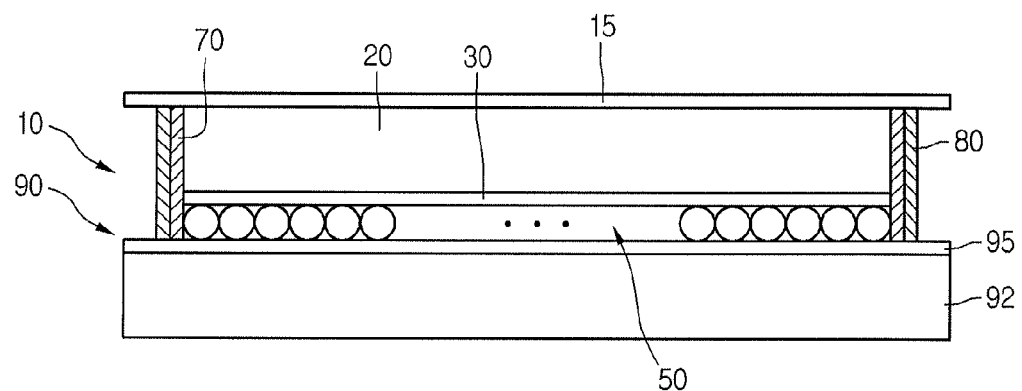

Referring to FIG. 4E, a second protective member 80 is formed on an outer surface of the first protective member 70 to correspond to at least a side surface of the ink layer 50 of the ink substrate 10 using a deep coating process or an ink printing process.

The second protective member 80 may be formed to the same area as the first protective member 70. Therefore, as the first and second protective members 70 and 80 are formed as a double layer, a side surface of the ink layer 50 can be protected against impact, heat, moisture, or the like generated from an external environment. In other embodiment, the second protective member 80 may be formed right after the first protective member 70 is formed. In another embodiment, the second protective member 80 may be omitted.

Forming of the second protective member 80 using the deep coating process or an ink printing process is the same as the forming of the first protective member 70, and thus more description will not be given.

The second protective member 80 may be formed of the same material as the first protective member 70. For example, the second protective member 80 may be formed of a resin-based material such as a sealant. Alternatively, the second protective member 80 may be formed of a different material from that of the first protective member 70. Various materials are available for the second protective member 80.

Since the second protective member 80 is formed in a liquid state, it should be cured to a solid state.

Since the microcapsules 60 of the ink layer 50 are susceptible to heat, ultraviolet curing may be performed rather than thermal curing. Therefore, the second protective member 80 may be formed of a light-curable material that is cured by ultraviolet light.

Figure 4F:
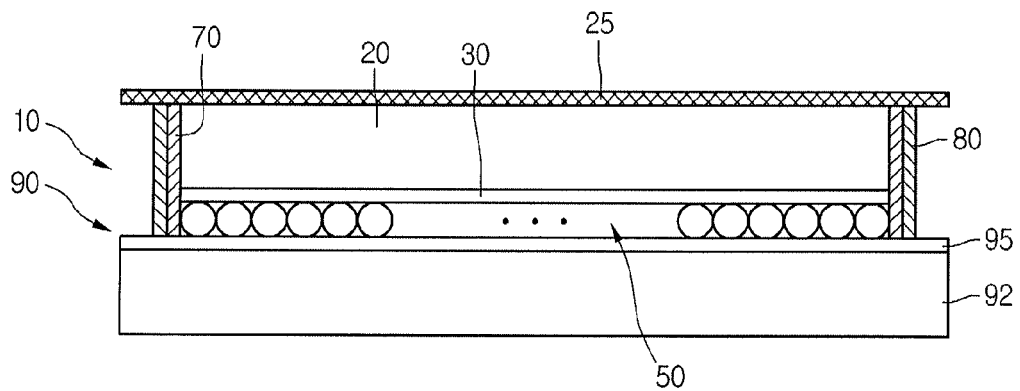

Referring to FIG. 4F, after removing the second release paper 15, a protective film 25 is formed on a rear surface of the first substrate 20 to protect the first substrate 20 of the ink substrate 10. The protective film 25 may be attached on a rear surface of the first substrate 20.

The second release paper 15 may be formed on the first substrate 20 with a third adhesive layer interposed therebetween. Therefore, even if the second release paper 15 is removed from the first substrate 20, the third adhesive layer is fixed to a rear surface of the first substrate 20, and thus the protective film 25 may be fixed to a rear surface of the first substrate 20 using the third adhesive layer.

The protective film 25 protects the first substrate 20 against contamination caused by foreign substances such as dust or damage such as scratch from an external environment.

An electrophoretic display device, which controls the ink layer 50 by an electric signal to display an image, can be fabricated by the above-described process.

FIGS. 5A to 5E are sectional views illustrating a method of fabricating an electrophoretic display device according to a third embodiment of the present invention.

The third embodiment of the present invention includes processes similar to the second embodiment of the present invention, except for a process of forming the protective film 25 on an ink substrate 10 prior to forming the first protective member 70. Therefore, the same description between the second and third embodiments will be omitted herein. The omitted description of the third embodiment will be easily understood with reference to the second embodiment.

Figure 5A:
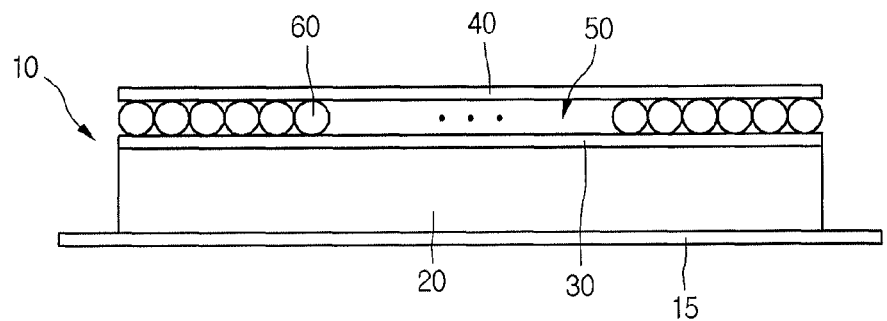
FIGS. 5A to 5E are sectional views illustrating a method of fabricating an electrophoretic display device according to a third embodiment of the present invention.

Referring to FIG. 5A, in order to provide an ink substrate 10, a first electrode and an ink layer 50 are disposed on a first substrate 20 and a first release paper 40 is disposed on the ink layer 50. Also, a second release paper 15 having at least a larger area than the first substrate 20 is disposed on a rear surface of the firs substrate 20.

A first adhesive layer (not shown) may be disposed between the first electrode 30 and the ink layer 50 and a second adhesive layer may be disposed between the ink layer 50 and the first release paper 40. Therefore, the ink layer 50 may be fixed to the first electrode 30 by the first adhesive layer, and the first release paper 40 may be fixed to the ink layer 50 by the second adhesive layer.

The first substrate 20 may be formed of a transparent and flexible material including a resin such as a PET resin, and the like, or glass.

Figure 5B:
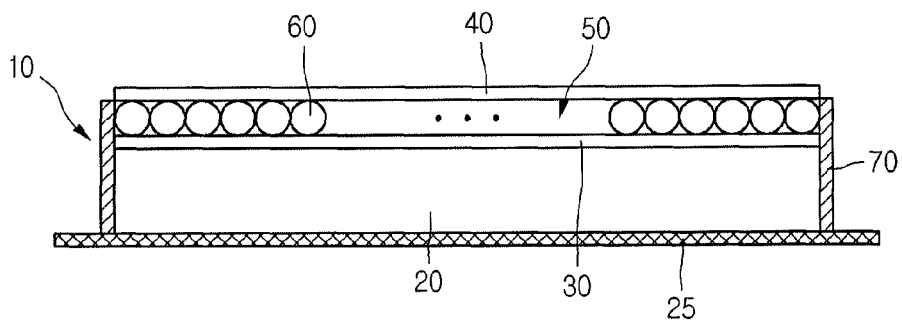

Referring to FIG. 5B, after removing the second release paper 15, the protective film 25 is formed to a rear surface of the first substrate 20 to protect the first substrate 20 of the ink substrate 10.

The second release paper 15 may be formed on the first substrate 20 with a third adhesive layer interposed therebetween. Therefore, even if the second release paper 15 is removed from the first substrate 20, the third adhesive layer (not shown) is fixed to a rear surface of the first substrate 20, and thus the protective film 25 may be fixed to a rear surface of the first substrate 20 using the third adhesive layer.

The protective film 25 may be formed to a larger area than the first substrate 20 in order to sufficiently protect the first substrate 20.

Next, the first protective member 70 is formed on at least the side surface of the ink layer 50 of the ink substrate 10 using the deep coating process or the ink printing process.

When using the ink printing process, the first protective member 70 may be formed on a side surface of the ink layer 50. Alternatively, the first protective member 70 may be formed on side surfaces of the ink layer 50, the first electrode 30, and the first substrate 20 to correspond to a side surface of the ink substrate 10.

When using the deep coating process, the first protective member 70 may be formed on side surfaces of the protective film 25, the first substrate 20, the first electrode 30, the ink layer 50, and the first release paper 40 and rear edges of the protective film 25 and the first release paper 40.

The first protective member 70 may be formed of a resin-based material such as a sealant.

Since the first protective member 70 is formed in a liquid state, it should be cured to a solid state.

Since the microcapsules 60 of the ink layer 50 are susceptible to heat, ultraviolet curing may be performed rather than thermal curing. Therefore, the first protective member 70 may be formed of a light-curable material that is cured by ultraviolet light.

Therefore, the first protective member 70 may protect the ink layer 50 from being damaged due to impact, heat, moisture, or the like generated from an external environment.

Figure 5C:
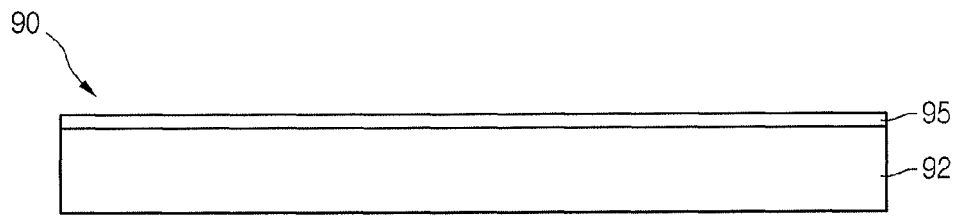

Referring to FIG. 5C, a driving substrate 90 is provided. The driving substrate 90 includes a driving device 95 disposed on a second substrate 92 and including a TFT (not shown) and a second electrode (not shown) in each pixel.

The second substrate 92 may be formed of a flexible material including a resin-based material such as a PET resin, glass, or metal.

Figure 5D:
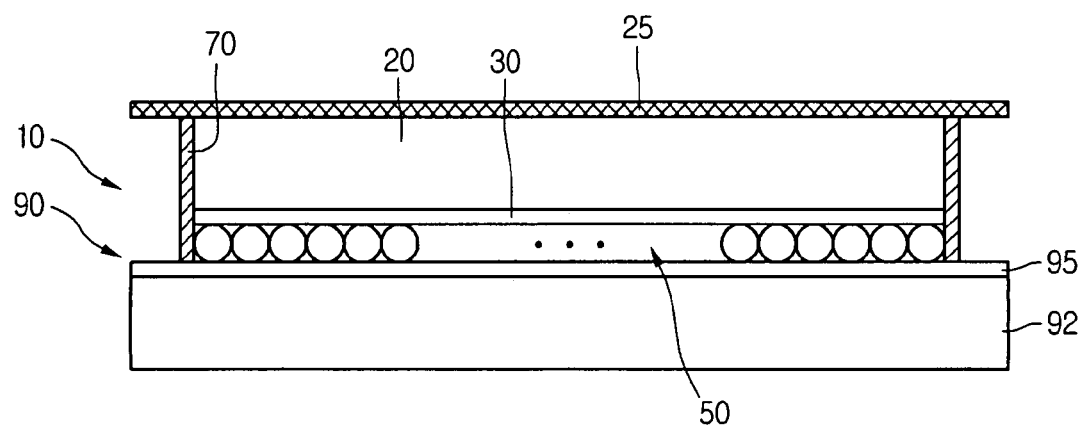

Referring to FIG. 5D, the sealed ink substrate 10 is attached to the driving substrate 90. In detail, the first release paper 40 is removed from the ink layer 50 of the ink substrate 10, and then the ink substrate 10 is pressed such that the second adhesive layer of the ink layer 50 is adhered to the driving device 95 of the driving substrate 90. Therefore, the ink substrate 10 can be firmly fixed to the driving substrate 90 by using the second adhesive layer.

Figure 5E:
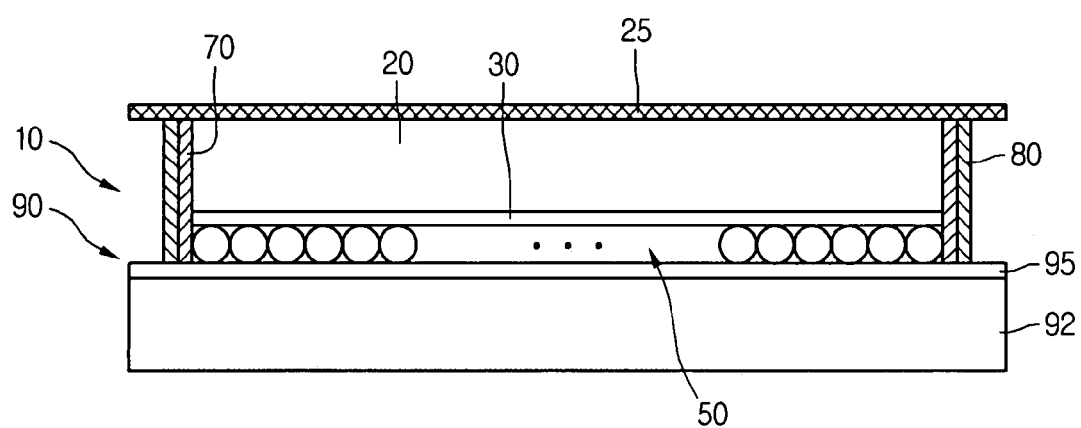

Referring to FIG. 5E, a second protective member 80 is formed on an outer surface of the first protective member 70 to correspond to at least a side surface of the ink layer 50 of the ink substrate 10 using a deep coating process or an ink printing process.

The second protective member 80 may be formed to the same area as the first protective member 70. Therefore, as the first and second protective members 70 and 80 are formed as a double layer, a side surface of the ink layer 50 can be protected against impact, heat, moisture, or the like generated from an external environment.

The second protective member 80 may be formed of the same material as the first protective member 70. For example, the second protective member 80 may be formed of a resin-based material such as a sealant. Alternatively, the second protective member 80 may be formed of a different material from that of the first protective member 70. Various materials are available for the second protective member 80.

Since the second protective member 80 is formed in a liquid state, it is cured to a solid state.

Since the microcapsules 60 of the ink layer 50 are susceptible to heat, ultraviolet curing may be performed rather than thermal curing. Therefore, the second protective member 80 may be formed of a light-curable material that is cured by ultraviolet light.

An electrophoretic display device, which controls the ink layer 50 by an electric signal to display an image, can be fabricated by the above-described process.

According to an ink substrate of the present invention, the ink layer is sealed without delay, which may result in secure protection of the ink layer against impact, heat, moisture, or the like generated from an external environment and subsequent manufacturing processes such as coupling with the driving substrate by disposing the first protective member on a side surface of the ink layer.

According to an electrophoretic display device of the present invention, an ink layer can be more securely protected against impact, heat, moisture, or the like generated from an external environment and the subsequent manufacturing processes by disposing a second protective member on an outer surface of a first protective member as a double layer.

Therefore, the present invention can display a clear image without malfunction in driving.

Also, the present invention can easily fabricate an electrophoretic display device that can securely protect an ink layer against impact, heat, moisture, or the like.

Figure 6A:
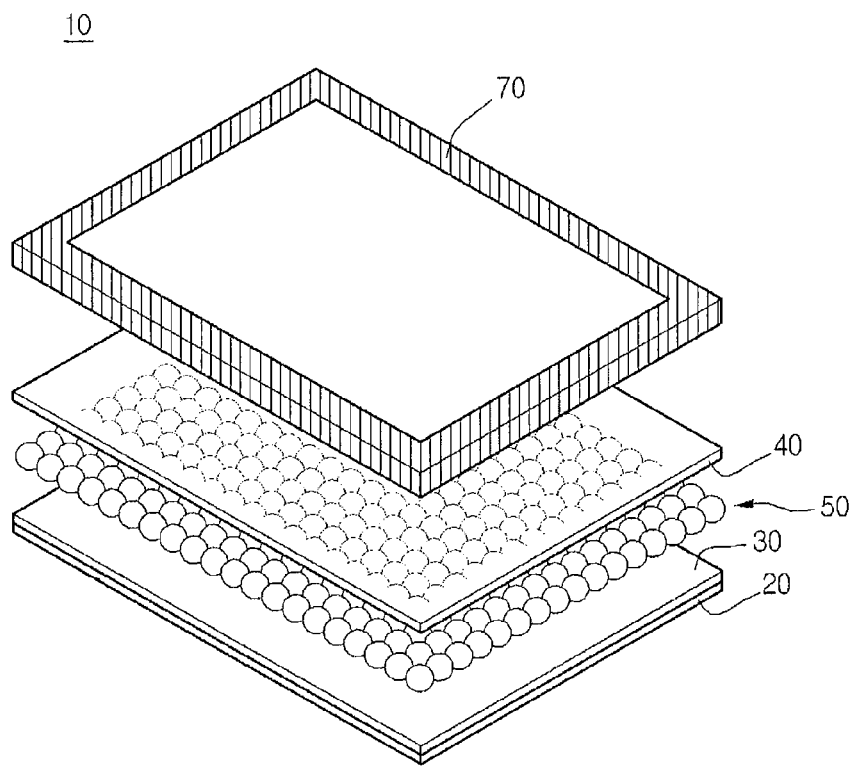
FIG. 6A is an exploded perspective view of an ink substrate according to a fourth embodiment of the present invention.
Figure 6B:
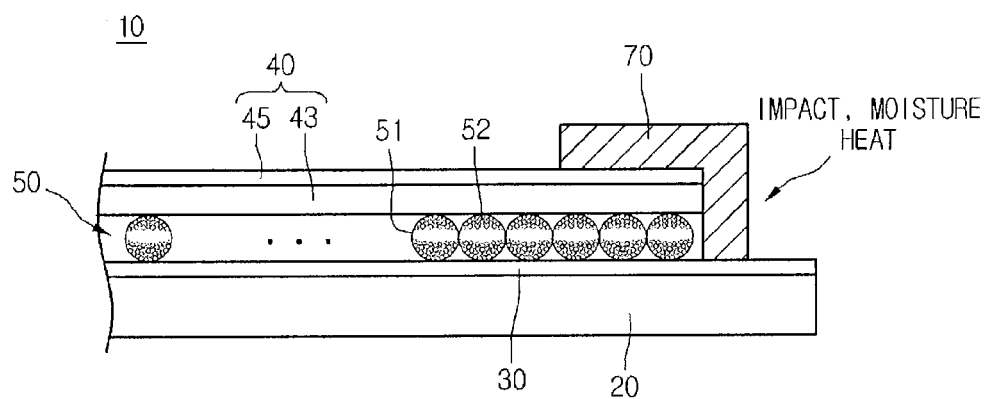
FIG. 6B is a sectional view of the ink substrate illustrated in FIG. 6A.

FIG. 6A is an exploded perspective view of an ink substrate according to a fourth embodiment of the present invention, and FIG. 6B is a sectional view of the ink substrate illustrated in FIG. 6A.

Referring to FIGS. 6A and 6B, the ink substrate 10 according to the present invention includes a first substrate 20, an ink layer 50 disposed on the first substrate 20 and including a plurality of charged particles 52, a cover film 40 disposed opposite to the first substrate 20 to protect the ink layer 50, and a first protective member 70 formed along edges of the substrate to protect the ink layer 50 from external pollution factors. The ink substrate 10 further includes a first electrode 30 interposed between the ink layer 50 and the first substrate 20 to drive the charged particles 52.

The first substrate 20 may become a flexible substrate suitable to form a flexible display device. More specifically, the first substrate 20 can be formed of glass, a metal material, or a plastic material.

The ink layer 50 can be formed on the first substrate 20. The ink layer 50 may include a plurality of microcapsules 51 which can encapsulate the charged particles 52.

The charged particles 52 can respond to negative and positive charges. The charged particles 52 include black particles absorbing light and white particles reflecting light. The white particles may include titanium oxide (TiO2) and the black particles may include carbon black.

The charged particles 53 within the ink layer 50 can realize a white color by reflecting light applied from the exterior. Also, the charged particles 52 can realize a black color by absorbing light applied from the exterior.

The cover film 40 may be disposed on the ink layer 50. The cover film 40 covers the ink layer 50 and protects the ink layer 50.

The cover film 40 may include an adhesive layer 43 and a release paper 45 disposed on the adhesive layer 43. The adhesive layer 43 is used to attach the ink substrate 10 to a drive substrate and so on, later. The release paper 45 protects a adhesive surface of the adhesive layer 43 and the ink layer 50.

In this manner, the ink layer 50 is formed in a film shape. Both surfaces of the ink layer 50 can be protected from the external pollution factors by the first substrate 20 and the cover film 40. However, side portions of the ink layer 50 can be exposed to the external pollution factors.

The present invention can provide the first protective member 70 to the side portions of the ink layer 50. The first protective member 70 can protect the side portions of the ink layer 50 from the external pollution factors. The first protective member 70 is formed along the side portions of the ink layer 50. As such, the first protective member 70 can be disposed on edges of the ink substrate 10.

The first protective member 70 may be formed in such a manner as to seal the ink layer 50. As such, the ink layer 70 can be protected against the intrusion of the external factors on its side surface.

In order to isolate the ink layer 70 from the external pollution factors, the first protective member 70 can be formed to cover a predetermined area of the cover film 40.

The first protective member 70 is preferably formed of a light curable material which can be formed by ultraviolet light. If heat is used for the formation of the first protective member 70 which isolates the ink layer 50 from the external pollution factors, the microcapsules 51 within the ink layer 50 can be damaged. As such, the side portion of the ink layer 50 is preferably sealed using ultraviolet light.

In this manner, the ink layer 50 is not exposed to the external pollution factors. As such, the ink layer 50 being susceptible moisture, heat, impact, or the like can be protected.

As described above, the first protective member 70 suitable for isolating the ink layer 50 from the external pollution factors is provided to the edges of the ink substrate 10. Therefore, the ink layer 50 does not deteriorate when the ink substrate 10 is fed and stored.

Figure 8:
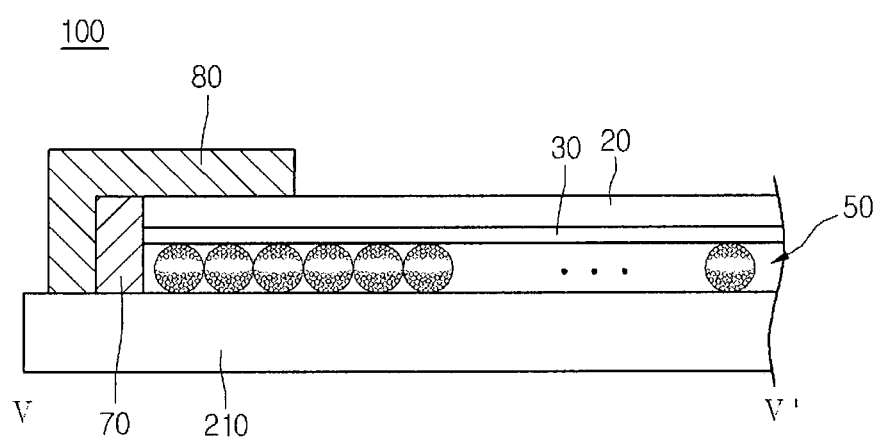
FIG. 8 is a sectional view showing the electrophoretic display device taken along a line V-V' in FIG. 7.

FIG. 7 is a planar view showing an electrophoretic display device, which use an ink substrate, according to a fifth embodiment of the present invention, and FIG. 8 is a sectional view showing the electrophoretic display device taken along a line V-V' in FIG. 7. The electrophoretic display device may employs the ink substrate illustrated in the FIGS. 6A and 6B.

Referring to FIGS. 7 and 8, the electrophoretic display device includes an ink substrate 10 and a driving substrate 210 which are combined with each other.

The driving substrate 210 includes a switching element and a plurality of electrodes. The switching element can drive the charged particles 52 within the ink layer 50.

The ink substrate 10 can be fed and stored in such a manner as to be protected against the external pollution factors by means of the first protective member 70, as shown in FIGS. 3A and 3B. As such, the deterioration of a part of the ink layer 50 disposed on the edge of the ink substrate can be minimized. This results from the fact that the ink substrate 10 is isolated from the external pollution factors by means of the first protective member 70.

In this way, the electrophoretic display device 100 is fabricated by combining the ink substrate 10 with the driving substrate 210. As such, The generation of a fault image due to a dull phenomenon and an ink smearing phenomenon in an edge of the electrophoretic display device 100 can be minimized.

Moreover, the release paper 45 and a part of the first protective member 70 are peeled from the ink substrate 10, and the adhesive layer 43 and the driving substrate 210 are adhered to each other. In this case, a laminating process can be performed for the ink substrate 10 and the driving substrate 210 in the fabrication of the electrophoretic display device 100.

In order to eliminate the cover film 40 on the ink substrate 10, the first protective member 70 can be partially removed from the side portion of the above-mentioned electrophoretic display device 100.

The electrophoretic display device 100 can further include a second protective member 80 disposed on its edges. The second protective member 80 is formed in such a manner as to cover the first protective member 70. Such a second protective member 80 can be formed of the same curable material as the first protective member 70. Therefore, the ink layer 50 can be doubly protected from the external pollution factors.

In this manner, the electrophoretic display device 100 is doubly isolated from the external pollution factors. As such, the electrophoretic display device 100 can provide a clear image to a user. In other words, the electrophoretic display device 100 including the above-mentioned ink substrate 10 can clearly display images.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An electrophoretic display device comprising:
   an ink substrate including:
      a first substrate having a first surface and a second surface opposing the first surface,
      an electrode adjacent the first surface of the first substrate,
      an ink layer adjacent the electrode, the ink layer including a plurality of microcapsules;
      a first protective member disposed and cured to form a sealed ink layer by contacting side surfaces of the first substrate, the electrode, the ink layer;
      a second protective member disposed and cured on an outer surface of the first protective member, wherein the first protective member is made of a material different from that of the second protective member; and
   a driving substrate attached to the ink layer of the ink substrate, the driving substrate including a second substrate and a plurality of driving devices disposed thereon,
   a protective film formed on the second surface of the first substrate;
   wherein the first protective member and the second protective member extend between the driving substrate and the protective film and do not extend beyond the first substrate and the ink layer, the first and second protective members contacting the driving substrate and the protective film, and
   wherein the first protective member is disposed and cured to form the sealed ink layer prior to the driving substrate being attached to the ink substrate.

2. The electrophoretic display device of claim 1, wherein the first and second substrates comprise a flexible transparent material including a metal material or a glass material.

3. The electrophoretic display device of claim 1, wherein the second protective member is formed in such a manner to overlap with a side surface of the ink layer and a predetermined area of the first substrate.

4. The electrophoretic display device of claim 3, wherein the predetermined area corresponds to a rimmed area of an upper surface of the first substrate.

5. A method of fabricating an electrophoretic display device, the method comprising:
   forming an ink substrate having an electrode on a first surface of a first substrate and an ink layer on the electrode;
   applying a first release paper on the ink layer;
   applying a second release paper on a second surface of the first substrate, the second surface opposing the first surface, the second release paper having a larger area than the first release paper;
   applying an ink protection liquid on an edge of the ink layer, the electrode and the first substrate and allowing the ink protection liquid to be collected on the second release paper such that a first protective member is formed on the side surface of the ink substrate;
   removing the first release paper;
   attaching the ink substrate to a driving substrate;
   disposing and curing a second protective member on an outer surface of the first protective member, wherein the first protective member is made of a material different from that of the second protective member;

wherein the first protective member is disposed and cured to form the sealed ink layer prior to the ink substrate attaching to the driving substrate; and removing the second release paper;

forming a protective film on the second surface of the first substrate, wherein the first protective member and the second protective member extend between the driving substrate and the protective film and do not extend beyond the first substrate and the ink layer, the first and second protective members contacting the driving substrate and the protective film.

6. The method of claim 5, further comprising curing the ink protection liquid to form the first protective member.

7. The method of claim 5, wherein forming the second protective member comprises spraying an ink protection liquid on at least the side surfaces of the ink layer and curing the ink protection liquid.

8. The method of claim 5, wherein forming the second protective member comprises dipping at least the side surfaces of the ink layer into an ink protection liquid and curing the ink protection liquid.

9. The method of claim 5, wherein forming the first protective member comprises forming the first protective member with a resin-based material.

10. The method of claim 5, wherein forming the second protective member comprises forming the second protective member with the material of the first protective member.

* * * * *

UNITED STATES PATENT AND TRADEMARK OFFICE
CERTIFICATE OF CORRECTION

| | | |
|---|---|---|
| PATENT NO. | : 8,482,514 B2 | Page 1 of 1 |
| APPLICATION NO. | : 11/827323 | |
| DATED | : July 9, 2013 | |
| INVENTOR(S) | : Seung Han Paek et al. | |

It is certified that error appears in the above-identified patent and that said Letters Patent is hereby corrected as shown below:

On the Title Page, item (54) and in the Specification, Column 1, line 1, title, after "INK" replace "SUBS RATE" with --SUBSTRATE--.

Signed and Sealed this
Twenty-eighth Day of January, 2014

Michelle K. Lee
*Deputy Director of the United States Patent and Trademark Office*